May 8, 1928.

B. S. AIKMAN

UNLOADER

Filed July 7, 1927

Inventor
Burton S. Aikman
By  Attys.

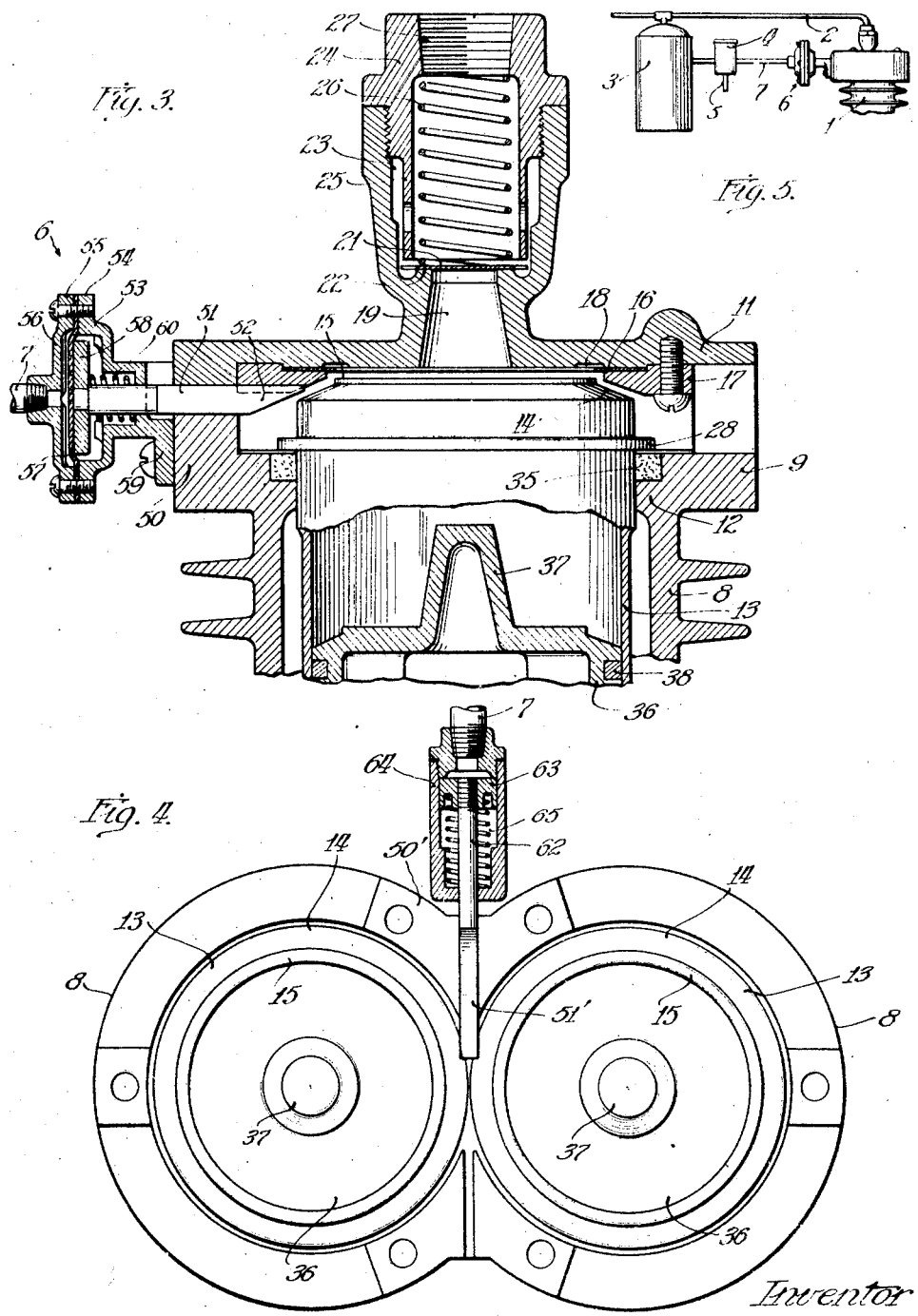

Patented May 8, 1928.

1,668,795

UNITED STATES PATENT OFFICE.

BURTON S. AIKMAN, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

UNLOADER.

Application filed July 7, 1927. Serial No. 203,922.

My invention relates to unloaders for compressors.

In certain forms of compressors recently developed by me, the intake valve comprises a sleeve actuated by the friction of the piston or the piston rings thereupon. Preferably, this sleeve seats against the bottom of the cylinder head during the compression stroke to provide a closed working cylinder, and the sleeve is moved away from its seat by the ring friction when the piston starts reverse motion.

In the smaller sizes, and particularly for intermittently operating compressors, it is generally unnecessary to provide any unloading means, since the valve will open with reverse motion of the piston, to permit the escape of any air compressed in the cylinder, or to permit escape of any compressed air leaking back into the cylinder past the discharge check valve. Upon starting of the motor, all that is required is normal compression from atmospheric pressure to the terminal pressure, and that can generally be performed by the motor, even though the same may be temporarily overloaded.

On the larger sizes, or on higher compression ratios, the heavy rush of current caused by starting under load is so objectionable that an unloader is desirable. Also, on continuously driven compressors it is desirable to provide unloading means which will unload the compressor after the pressure in the receiver has attained a predetermined value.

It is the aim of the present invention to provide an unloader of simple, reliable and inexpensive construction which will act to unload a compressor of the above described type.

In order to acquaint those skilled in the art with the manner of constructing and operating a device embodying my invention, I shall describe in connection with the accompanying drawings a specific embodiment of the same.

In the drawings,

Fig. 3 is a vertical longitudinal section similar to Fig. 1, showing a modification of my invention;

Fig. 4 is a horizontal sectional view of a modification of the invention in which the unloader is arranged to unload a two-cylinder compressor of this type; and Fig. 5 is a diagram of connections for purposes of explaining the mode of operation of the invention.

Figure 1:
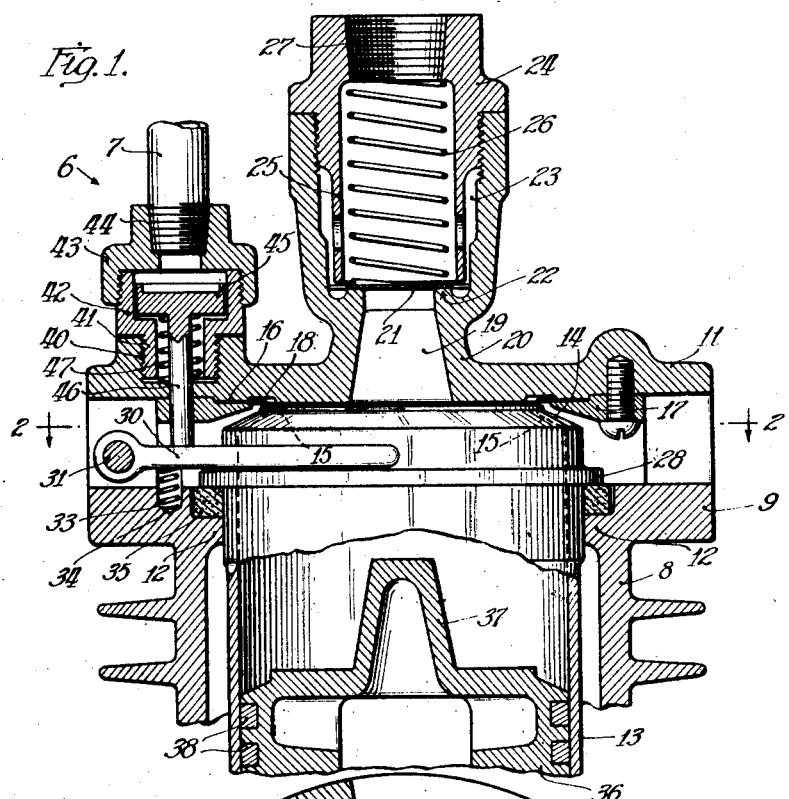
Fig. 1 is a longitudinal vertical section of a compressor embodying an unloader of my invention.
Figure 2:
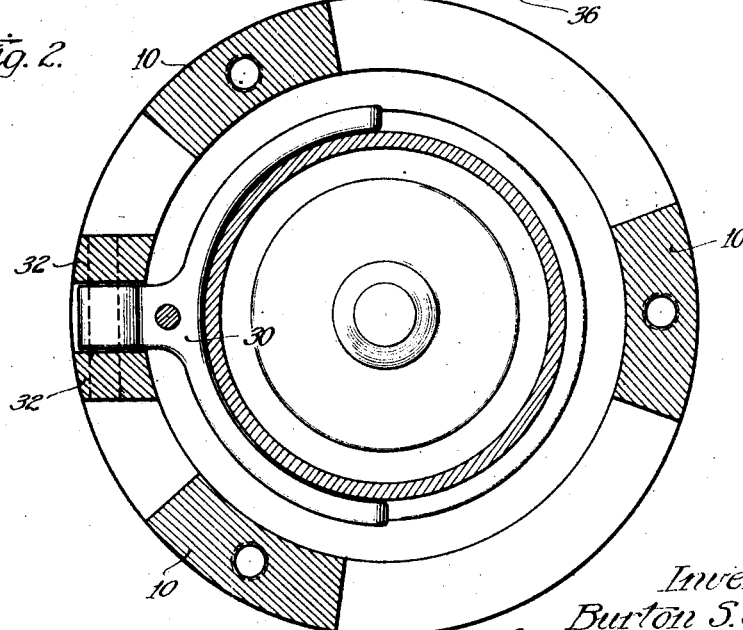
Fig. 2 is a horizontal cross-sectional view taken on the line 2—2 of Fig. 1.

Referring now to Fig. 1, the compressor 1 is normally driven by an electric motor which is stopped and started under the control of a switch, which may be either manually or automatically operated, and which is not shown for the sake of clearness. The compressor 1 discharges by way of a discharge line 2 to a reservoir 3. A pressure regulator 4 connected to the reservoir 3, operates on the attainment of a predetermined maximum pressure in the tank 3 to close the atmospheric vent 5 to the unloader cylinder 6 and to open the pressure connection 7 to said unloader to stop further compression of air or other gas until such time as the pressure in the reservoir 3 drops below a predetermined minimum, whereupon the regulator 4 shuts off the connection of live air to the regulator 6 and opens the atmospheric vent 5 to said regulator 6 to cause the same to act to permit the compressor to function.

Referring now to Fig. 1, the cylinder 8 has a suitable flange 9 at its upper end from which rise the posts or webs 10. To these posts or webs 10 the head member 11 is bolted. At its upper end the cylinder 8 has an inwardly extending flange 12 forming a guide for the upper end of the valve sleeve 13. At its upper end the valve sleeve 13 has, externally, a conical shoulder 14 terminating in an annular rim which is faced off normal to the axis of the sleeve 13.

The head 11 has a thin annular disc 16 clamped under the inner edge of a clamping ring 17. The inner edge of the ring 16 is free and overhangs a shallow groove 18 formed in the bottom of the cylinder head 11 to permit the interior of the sleeve 13 to communicate with the space back of said ring 16 when the sleeve is raised into contact with the ring 16.

The cylinder head 11 has a discharge passageway 19, preferably of conical shape, extending up through an integral neck 20.

This discharge passageway at its upper end is controlled by a disc valve 21 of the poppet type, seating upon a suitable seat formed at the upper end of the passageway 19. This seat 22 is disposed within a chamber 23, termed the discharge valve chamber or discharge valve pocket. The upper end of this chamber is closed by a fitting 24, which has a spring guide 25 depending into the pocket 23 and forming a stop for upward motion of the valve 21. A suitable compression spring 26 applies the valve 21 to its seat. The fitting 24 has a pipe socket 27 to connect the discharge pipe 2 for leading away the hot compressed air.

The valve sleeve 13 has a collar 28 forming at its upper side a shoulder adapted to be engaged by the limbs of a forked lever 30. This lever forms the unloading lever for the valve sleeve 13. It is hinged for a short swinging motion on the pin 31, which extends through the lugs 32—32, preferably cast integral with the flange 9. A small compression spring 33 is seated in a pocket 34 below the main stem of the lever, and this spring tends at all times to raise the limbs of the forked lever 30 out of contact with the shoulder formed by the upper surface of the collar 28.

The collar 28 provides a shoulder at its lower face adapted to engage the resilient stop 35 which restrains the downward motion of the sleeve 13.

The valve sleeve 13 contains a working system 36 provided with a suitable dome or projection 37 adapted to enter the discharge port 19 for the sake of minimizing the clearance space. The piston 36 is provided with one or more metal packing rings 38 of the split ring type, or any preferred type, for securing a tight fit between said piston and the inner wall of the sleeve 13. The sleeve 13 is actuated by the movement of the piston 36, being dragged up or down, as the case may be, by the friction of the piston 36 with the interior surface of the sleeve 13. In detail, it is the friction of the split rings 38 expanded into contact with the walls of the sleeve 13 which permits the piston to seize the sleeve sufficiently to cause it to be moved up or down at the beginning of an up or down stroke of the piston. The sleeve 13 is guided in a suitable guide at its lower end, not shown.

The head member 11 has a threaded socket 40 which is adapted to receive the threaded stud 41 formed on the lower end of the unloading cylinder 42. This unloading cylinder 42 has a removable head 43 threaded on its upper end, and providing a pipe socket 44 for the connecting pipe 7 from the regulator 4. A suitable piston 45 is fitted in the cylinder 42, and it has a stem 46 which extends down through a hole in the flange of the head member 11 where it may engage at its lower end the pivoted unloading lever 30 for forcing the valve sleeve 13 downwardly against its resilient stop 35.

A spring 47 tends normally to raise the piston 45 and stem 46 out of contact with the lever 30.

Due to the ample cooling which is secured in a compressor of this type, it is possible to mount the unloading cylinder 42 directly upon the cylinder head. The return of heat from the discharge valve chamber 23 to the cylinder head 11 is prevented by the neck 20 of reduced cross-section of metal of low heat conductivity.

The operation of the device is as follows:—

Assuming that the piston 36 is rising on the compression stroke, the friction of the rings 38 with the interior of the sleeve 13 raises the upper end surface 15 of said sleeve into contact with the margin of the flexible metal ring 16, closing the cylinder for compression. While the member 8 is termed a cylinder, the actual working cylinder is defined by the sleeve 13 and the head 11 and piston 36. As the piston 36 reaches the upper end of its stroke and has discharged the contents of the working cylinder past valve 21, it comes for a brief period of time to rest and reverses its direction. As it reverses, the friction of the rings 38 on the inside of the sleeve 13 pull the cylinder down until the collar 28 engages the stop 35, further motion drawing in air over the top edge 15 of the sleeve into the working cylinder. When the receiver 3 has been charged to the predetermined pressure, the controller 4 closes off the atmospheric vent 5 and admits pressure from the receiver 3 to the pipe 7. The compressed air, acting upon the piston 45 forces the rod 46 down into contact with the lever 30 with sufficient force to overcome the pressure of the spring 33, and either to force the sleeve valve downwardly at once, or to do so upon the next suction stroke, and thereafter to hold it open to prevent further compression of gas. It is not necessary that the unloader be made powerful enough to push the sleeve 13 downwardly during a compression stroke, it need only be of sufficient power to hold the sleeve 13 open against the tendency of the ring friction to close the same.

In the structure shown in Fig. 3, the compressor structure is substantially the same as shown in Fig. 1. In this case, however, the lug 50 replaces the lugs 32 and it forms a guide for the unloader plunger 51 which has a tapered end, as shown at 52, adapted to ride upon the conical or tapered surface 14 of the sleeve valve 13. In this case, the unloader motor comprises a motor frame 53 having a suitable circular flange 54 to which there is clamped by means of the companion flange 55 on the motor chamber 56, a flexible diaphragm 57 bearing against the movable piston member 58 having the stem 51 secured thereto. The motor frame 53 is connected by a clamping flange or foot 59 to the integral lug 50 forming a part of the cylinder frame 8. A compression spring 60 seating in a pocket in the bottom of the frame 53 urges the piston 58 and the plunger 51 to the left so that the tapered end 52 lies out of the way of the movable valve sleeve 13. The part of the plunger 51 which extends into the lug 50 is formed preferably of square cross section so as to maintain the proper position of the tapered face thereof.

The operation of this embodiment is as follows:—

When the controller 4 operates to close the atmospheric vent 5 and admits pressure to the pipe 7 leading to the unloader 6, the diaphragm 57 is forced to the right carrying the piston 58 and plunger 51 with it and forcing the tapered face of the plunger 51 into engagement with the conical shoulder 14 on the valve sleeve 13. This pressure may be made great enough to force the sleeve 13 downwardly during the compression stroke, or it may be, in the case of a single cylinder, only great enough to block the upward rise of the sleeve after the sleeve has descended on a suction stroke, the wedging face 52 being thus in place to prevent rise of the sleeve thereafter.

In Fig. 4 I have shown the manner in which a compressor of the two cylinder type embodying the sleeve valve may be unloaded by an unloader of my invention. In this case, the plunger 51' has a tapered face at its lower front edge adapted to engage simultaneously the shoulders 14—14 of the two cylinders 13—13.

The plunger 51' is preferably of non-circular cross-section, for example being square, and connected by a round portion 62 to the piston 63 playing in the unloader cylinder 64. The plunger 51' is normally held out of the way of the valve sleeve 13—13 by a suitable spring 65. When the regulator 4 closes off the atmospheric vent 5 and admits live pressure to the pipe 7, the plunger 63 is thrust downwardly, as viewed in Fig. 4.

In this construction, the pressure of the piston 63 is preferably sufficiently powerful to force both of the sleeves 13 downwardly, but by allowing a small rocking motion of the plunger 51', the sleeves may be held open, one at a time, as they are opened by ring friction. That is to say, assume that the right hand sleeve 13 first moves down when the piston 51' is thrust downwardly as viewed in Fig. 4. Rocking of the plunger 51' permits it to hold the right hand sleeve 13 down, and then when the left hand sleeve 13 is moved downwardly by ring friction the plunger 51' advances further and rocks at the same time to catch the sleeve 13 in open position. Thereby both sleeves are blocked open without the necessity for forcing them open simultaneously.

While I have shown the unloader lever 30 and the plungers 51 and 51' as actuated by air pressure automatically, it is to be understood that these parts might be actuated manually or by oil pressure or other means without departing from the invention. Also, while I have shown the sleeve 13 as actuated by ring friction, it is to be understood that it might be actuated by cam motion through a suitable yieldable connection as through a compression spring of a given strength and blocking of the sleeve valves in the open position would result only in compression of such spring connection. My invention is applicable to sleeve valves where the operation of the same is through a yieldable mechanism.

The lever 30 of Fig. 1 may be employed for unloading two cylinders as well. In that case, a lateral rocking motion is permitted for holding down first one valve sleeve while the other is raised, and then holding down both upon the opening of the second.

I claim:—

1. In a compressor, a cylinder, a head, a sleeve valve having a seat upon the head, an unloader cylinder having a piston, and means actuated by said piston for holding said sleeve away from its seat on said head to unload the compressor.

2. In a compressor, a cylinder frame, a valve sleeve therein, means cooperating with the valve sleeve to form a closed working cylinder, a piston in the sleeve, said sleeve being moved by the friction of the piston therein to open and close the valve sleeve, and means for blocking the valve sleeve in open position for unloading the compressor.

3. In a compressor, a cylinder, a head, a sleeve valve having a seat upon said head, said sleeve having a shoulder and an unloader member adapted to engage said shoulder to hold said sleeve away from said head to unload the compressor.

4. In a compressor, a cylinder, a head, a sleeve valve having a seat upon said head, an unloader cylinder having a piston, said sleeve valve having a shoulder and a member controlled by said piston adapted to engage said shoulder to hold said sleeve away from said head to unload the compressor.

5. In a compressor, a cylinder, a head, a sleeve valve having a seat upon said head, an unloader cylinder having a piston, said sleeve valve having a shoulder, and a member adapted to travel in a plane normal to the axis of said sleeve valve for engaging said shoulder to hold the sleeve valve open to unload the compressor.

6. In a compressor, a cylinder, a head, a sleeve valve having a seat upon said head, an unloader cylinder having a piston, said sleeve valve having an inclined shoulder and a wedge member actuated by said piston and adapted to travel along said shoulder to hold the sleeve valve off of its seat for unloading the compressor.

7. In a compressor, a cylinder frame, a valve sleeve therein, means cooperating with the valve sleeve to form a closed working cylinder, a piston in the sleeve, said sleeve being moved by the friction of the piston therein to open and close the valve sleeve, an unloader cylinder having an unloader piston, and means operated by the unloader piston to hold the valve sleeve in open position for unloading the compressor.

In witness whereof, I hereunto subscribe my name this 1st day of July, 1927.

BURTON S. AIKMAN.